(12) United States Patent
Fest et al.

(10) Patent No.: US 6,870,459 B1
(45) Date of Patent: Mar. 22, 2005

(54) THEFT PROTECTION SYSTEM FOR AN AUTOMOBILE AND METHOD FOR INITIALIZING THE THEFT PROTECTION SYSTEM

(75) Inventors: Dieter Fest, Regensburg (DE); Markus Edsperger, Steinach (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 09/250,878

(22) Filed: Feb. 16, 1999

(30) Foreign Application Priority Data

Feb. 13, 1998 (DE) .......................................... 198 05 969

(51) Int. Cl.[7] .................................................. H04Q 1/00
(52) U.S. Cl. ...................................................... 340/5.3
(58) Field of Search ............................... 340/5.3, 825.3, 340/825.32, 426, 825.31, 825.34, 428, 5.21, 5.61, 5.72, 5.26

(56) References Cited

U.S. PATENT DOCUMENTS

| | | | | |
|---|---|---|---|---|
| 5,254,842 A | * | 10/1993 | Posner et al. ............... | 340/5.72 |
| 5,675,490 A | * | 10/1997 | Bachhuber ........... | 364/424.037 |
| 5,699,685 A | * | 12/1997 | Jahrsetz et al. ............... | 70/264 |
| 5,796,329 A | * | 8/1998 | Bachhuber ................... | 340/426 |
| 5,939,975 A | * | 8/1999 | Tsuria et al. ................. | 340/426 |
| 5,945,906 A | * | 8/1999 | Onuma ........................ | 340/5.62 |
| 6,144,113 A | * | 11/2000 | Hayashi et al. ............. | 307/10.5 |
| 6,225,889 B1 | * | 5/2001 | Furuta et al. ................ | 340/426 |

FOREIGN PATENT DOCUMENTS

| | | |
|---|---|---|
| DE | 43 33 474 C2 | 9/1995 |
| DE | 195 26 530 C1 | 8/1996 |
| EP | 0 55 532 A2 | 8/1993 |
| GB | 2 027 126 A | 2/1980 |
| WO | WO 95/05958 | 3/1995 |
| WO | WO 98/132567 | 4/1998 |

* cited by examiner

Primary Examiner—Brian Zimmerman
(74) Attorney, Agent, or Firm—Laurence A. Greenberg; Werner H. Stemer; Gregory L. Mayback

(57) ABSTRACT

A theft protection system for an automobile and a method for initializing the theft protection system transmit a challenge signal from a central control unit over a data line during the initialization of the theft protection system, after a starting signal has been received. Control units that are connected to the data line send back an identification which is stored in the central control unit. The extent of the control units tied into the theft protection system is thus fixed. During subsequent authentication operations, all of those control units must answer with their identification, before the automobile can be used. An electronically coded dongle is advantageously used as a control unit.

6 Claims, 2 Drawing Sheets

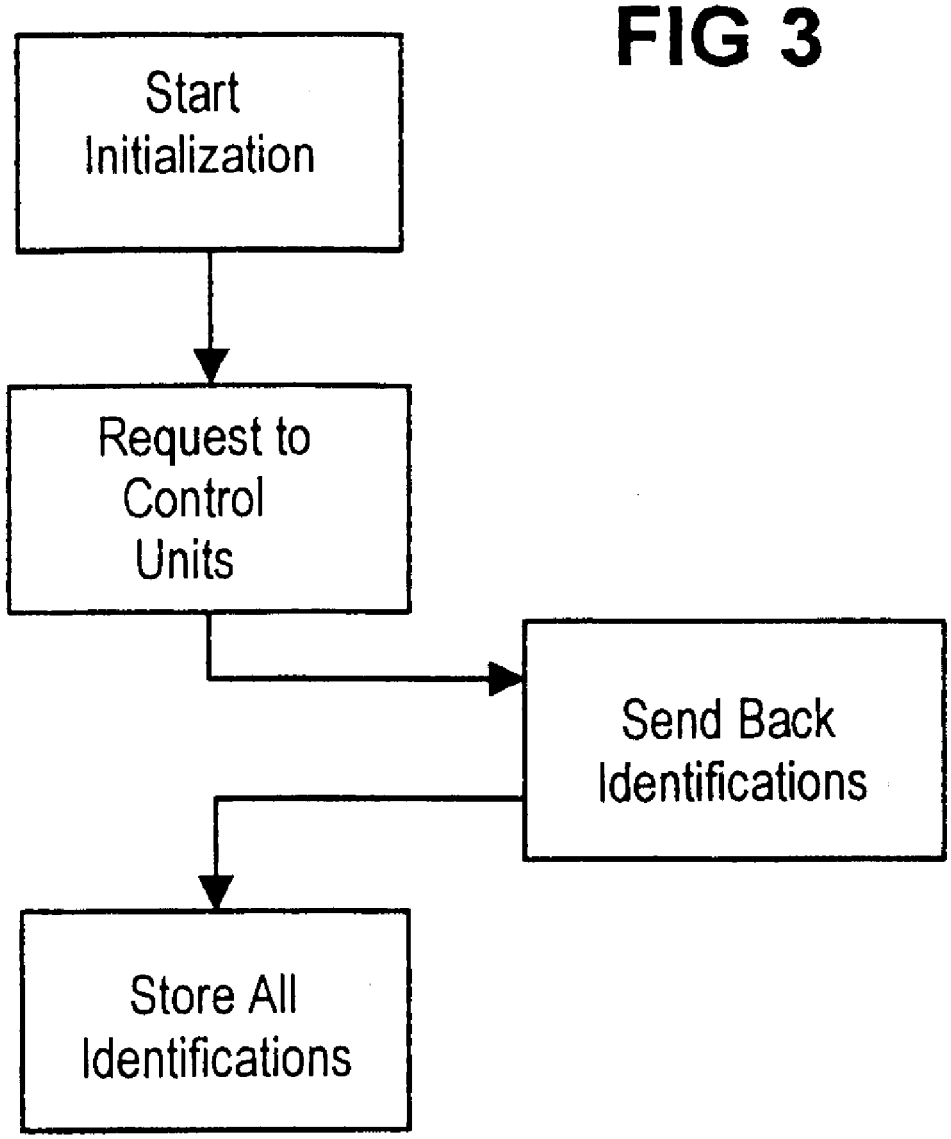

THEFT PROTECTION SYSTEM FOR AN AUTOMOBILE AND METHOD FOR INITIALIZING THE THEFT PROTECTION SYSTEM

BACKGROUND OF THE INVENTION

1. Field of the Invention

The invention relates to a theft protection system for an automobile, in particular an immobilizer, in which control units are cleared only when a code signal is recognized as being authorized.

A theft protection system which is known from German Patent DE 43 33 474 C2, corresponding to U.S. Pat. No. 5,675,490, has one or more code generators which send their code signal to a test unit in the automobile. The test unit is connected to a plurality of control units by a data line. After the code signal has been received, the test unit requests all of the control units connected to the data line to send back their identification. The test unit checks the authorization of the identifications and, when a predetermined number of control units answer correctly, the automobile is cleared for starting.

The test unit of such a theft protection system must know, from the outset, which control units are tied into the theft protection system. Since automobiles often have different equipment, in the known theft protection system each test unit has to be prepared for the level of equipment through the use of preset software, before the test unit can carry out an authentication operation.

German Patent DE 195 26 530 C1, corresponding to U.S. Pat. No. 5,796,329, likewise discloses a theft protection system for an automobile and a method for initializing the theft protection system. In that case, a plurality of control units are tied into the system and all have to feed back their identification code word correctly before the automobile can be started. If a control unit is exchanged, the new control unit first has to be initialized. The key codes of two keys are required for this purpose. Moreover, the identifications of control units are interrogated by a test unit. Then, when both keys are accepted by the test unit and clearance is given to the test unit through a diagnostic unit, the new code words are stored in the exchanged control unit.

SUMMARY OF THE INVENTION

It is accordingly an object of the invention to provide a theft protection system for an automobile and a method for initializing the theft protection system, which overcome the hereinafore-mentioned disadvantages of the heretofore-known devices and methods of this general type, which are simple and which can be easily adapted to any type of automobile.

With the foregoing and other objects in view there is provided, in accordance with the invention, a method for initializing a theft protection system of an automobile, which comprises sending a starting signal to a central control unit, for initiating an initialization; transmitting a challenge signal from the central control unit over a data line; sending identification code signals to the central control unit from control units connected to the data line; and storing all of the identification code signals or all of the answering control units in the central control unit as belonging to the theft protection system, for requesting identification code signals from all of the control units and checking them as to authorization, during future authentication operations.

Through the use of this method, identifications of all of the control units connected to a data line are advantageously recorded only during an initialization operation and are stored permanently.

In accordance with another mode of the invention, the starting signal is sent to the central control unit by a diagnostic unit located outside the automobile. Likewise, the starting signal may be generated as a result of unusual actuation of a switch in the automobile.

With the objects of the invention in view, there is also provided a theft protection system for an automobile, comprising a central control unit having an antenna; a data line connected to the central control unit; a plurality of control units connected to the data line; an input unit sending a starting signal to the central control unit for starting an initialization; and a portable code generator sending a code signal to the antenna on request, causing authentication to take place between the central control unit and the control units, and permitting an automobile to be used after authentication has occurred successfully.

In accordance with another feature of the invention, one of the control units is an electronically coded plug part which is connected releasably to the data line. The user or the automobile manufacturer may thereby decide himself or herself whether or not such a plug part is also to be included in the authentication operation.

In accordance with a further feature of the invention, the input unit is a diagnostic unit located outside the automobile, the diagnostic unit sending a starting signal to the central control unit through a diagnostic interface for initiating initialization.

In accordance with a concomitant feature of the invention, the input unit is an input unit located inside the automobile, the input unit generating the starting signal in the event of predetermined actuation and sending it to the central control unit for initiating initialization.

Other features which are considered as characteristic for the invention are set forth in the appended claims.

Although the invention is illustrated and described herein as embodied in a theft protection system for an automobile and a method for initializing the theft protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a flow diagram of a method for initialization of the theft protection system.

DESCRIPTION OF THE PREFERRED EMBODIMENTS

Figure 1:
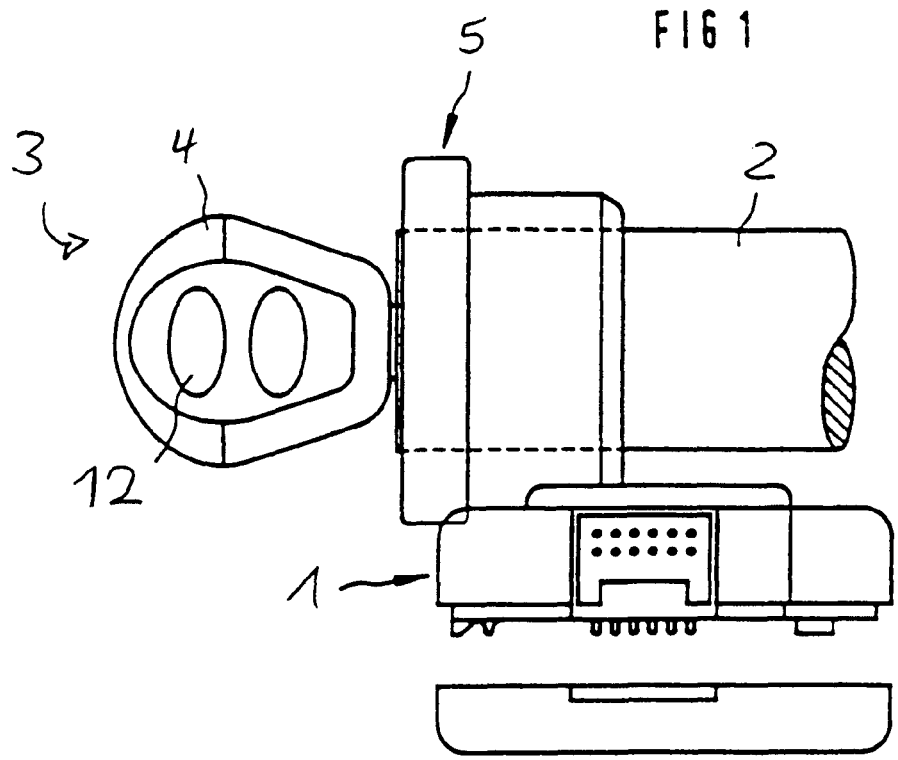
FIG. 1 is a fragmentary, diagrammatic, side-elevational view of a theft protection system according to the invention.
Figure 2:
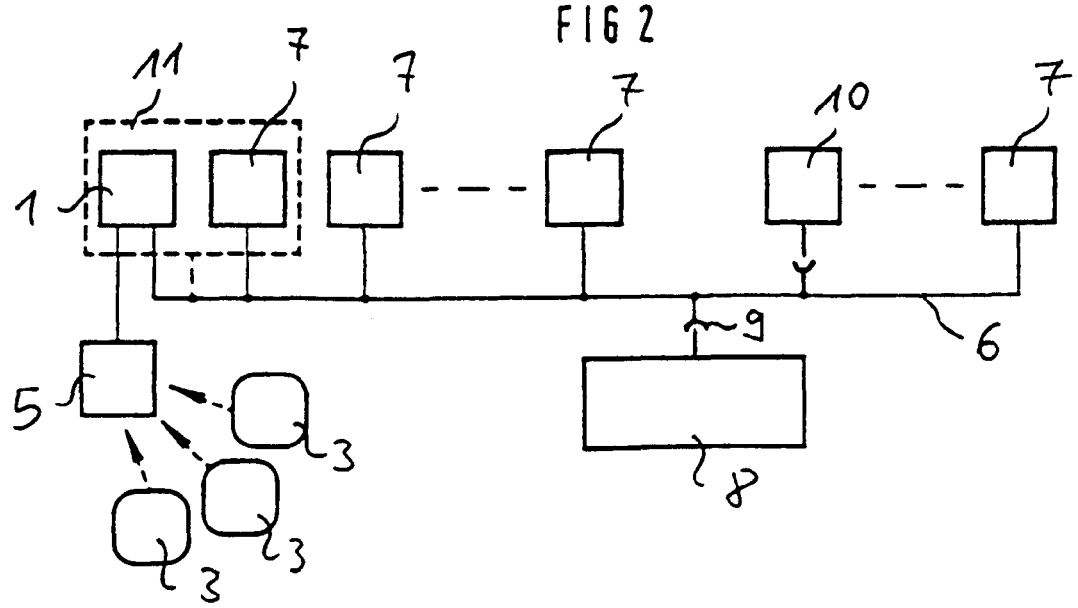
FIG. 2 is a block diagram of the theft protection system.

Referring now to the figures of the drawings in detail and first, particularly, to FIGS. 1 and 2 thereof, there is seen a theft protection system of an automobile, in particular an immobilizer, which can prevent the intended use of an automobile by an unauthorized user. For this purpose, the theft protection system has a central control unit 1 which is disposed, for example, in a housing on an ignition lock 2 of the automobile, as is shown in FIG. 1. A portable code generator 3 is disposed, for example, on an ignition key 4. As soon as the ignition key 4, together with the code generator 3, is inserted into the ignition lock 2 and rotated, a code signal is sent to an antenna 5 on the ignition lock 2. The antenna transmits the code signal to the central control unit 1. The code signal is checked for authorization in the central control unit 1 and, in the event of authorization, a challenge signal is sent, over a data line 6 or a bus, to control units 7 which are connected to the data line 6, as is shown in FIG. 2. The connected control units 7, after receiving the challenge signal, send back binary-coded identification codewords (which are referred to below as identifications) to the central control unit 1. The identifications are compared with stored identifications in the central control unit 1. If they agree with one another, a clearance signal is generated, which clears all of the control units 7, so that the automobile can be used (by starting the engine and driving away). If there is no agreement, the control units 7 remain blocked and the automobile cannot be used.

The operation of this so-called authentication is already explained by way of example in German Patent DE 43 33 474 C2, corresponding to U.S. Pat. No. 5,675,490, as initially mentioned. The authentication operation will therefore not be dealt with in any more detail herein.

The entire theft protection system must first be initialized so that the central control unit 1 knows all of the identifications of all of the connected control units 7. The initialization operation is explained in more detail through the use of the flow diagram of FIG. 3.

First, a starting signal is transmitted. This starting signal can come from a diagnostic unit 8 which is located outside the automobile and which is available, for example, in an authorized workshop or repair shop. There, the diagnostic unit 8 is plugged to the data line 6 through a diagnostic interface 9 in the automobile. The starting signal is sent to the central control unit 1 only upon proof of authorization. The starting signal has a predetermined coding, through the use of which initialization is initiated in the central control unit 1, as illustrated in FIG. 3.

After the starting signal has been received, the central control unit 1 sends a challenge signal to all of the connected control units 7 over the data line 6, so that they send back their identifications.

In each control unit 7, a coded identification is stored or is generated there with the aid of a stored mathematical algorithm. After the challenge signal has been received, the identifications are sent back to the central control unit 1. The central control unit 1 then stores all of the identifications as belonging to the theft protection system. For the sake of security, the stored identifications cannot be read out from outside, either from the central control unit 1 or from a control unit 7.

Through the use of the identifications, the central control unit 1 knows all of the control units 7 which are interrogated as to their identifications and checked as to their authorization for the purpose of the authentication operation, in the theft protection system that was just initialized.

If a thief then steals an automobile, on one hand he or she requires an authorized code generator 3, and on the other hand he or she requires all of the control units 7 that were originally present during the initialization operation. If he or she does not possess the code generator 3, it is not sufficient for him or her to exchange a control unit 7 in order to bypass the theft protection system. He or she would have to exchange all of the control units 7, but that is highly complicated and costly. It is therefore more difficult for him or her to use the automobile.

If a control unit 7 is not initialized (for example since it has been exchanged) and therefore does not, at first, belong to the theft protection system, the user can initialize the theft protection system again if he or she possesses the authorized code generators 3. The code signal can be partly transmitted several times as a result of an unusual actuation of the ignition key 4 in the ignition lock 2 (for example by rotating it back and forth several times), and this then has the effect of a starting signal for initializing the theft protection system.

Subsequently installed control units do not have to be tied into the theft protection system. The legitimate user can therefore extend the equipment of his or her automobile, without this having any influence on the theft protection system. He or she therefore does not even need to go to an authorized workshop or repair shop in order to change the equipment.

Advantageously, one of the control units 7 is constructed as an electronically coded plug part 10 (that is also referred to below as a "dongle"), which is connected pluggably, and therefore releasably, to the data line 6. In the case of initialization at the end of an assembly line, an automobile manufacturer can determine whether or not such a dongle 10 is used during initialization. If it is used, the dongle 10 must be present during future authentication operations, so that the vehicle can be used. Even during later initializations, the authorized user can decide whether or not he or she wishes to use the dongle 10.

The advantage of a dongle 10 is that it can be very small, since it only has to contain small electronics with an electronic coding. The dongle 10 can therefore easily be concealed in the automobile, so that an unauthorized person cannot find it. Outsiders consequently do not know whether or not the dongle 10 is provided or where it is disposed. Security against theft is thereby increased.

The central control unit 1 may have its own housing, as illustrated in FIG. 1, or it may be disposed so as to be integrated into a control unit 7, such as an engine control unit. It may also be accommodated, together with a control unit 7, in a security housing 11. Other control units 7 which may be connected to the data line 6 are a transmission control unit, an airbag control unit, an ignition control unit, a central switching and securing control unit, etc.

It is only those control units 7 which are present during the initialization of the theft protection system and send back their identification that are also included later in an authentication operation and must send back their identification correctly so that the automobile can be used properly. Such a theft protection system can therefore be used universally in different types of automobiles with different levels of equipment. Thus, one automobile may have a transmission control unit for an automatic transmission, while another automobile has a shift transmission without a transmission control unit. The central control unit 1 does not have to be preprogrammed to the level of equipment. The level of equipment is recognized during initialization, through the use of the identifications which are fed back. All of the control units 7 which are recognized are then also tied into the theft protection system.

At least one control unit 7 and the coded plug part 10 must be tied into the theft protection system so that there is a sufficient degree of security. The more control units 7 that are tied in, the higher the degree of security against the unauthorized use of the automobile.

The code generator 3 may be a transponder which transmits an response signal (response), after an interrogation signal (challenge) has been received. A transponder is a small component which may be disposed both on a key grip and on a card of the size of a check card. The transponder, in turn, has an antenna which receives signals or sends them to the antenna 5 on the ignition lock 2. Advantageously, the antennas are constructed as coils, through the use of which the signals are transmitted inductively.

The code generator 3 may also have a switch or a button 12. During actuation of the switch or button 12, the code signal is sent by radio transmission to the antenna 5 at the central control unit 1.

Advantageously, the code signal and the challenge signal change after each transmission according to a predetermined secret algorithm, so that it is futile to listen to the signals. The identifications are sent back by the control units only when the challenge signal has previously been received correctly. The identifications can therefore also not be read out in an unauthorized manner.

The identifications of the various control units 7 must differ from one another. The identifications are binary-coded codewords, the bit length of which determines the complexity of the code. Thus, the theft protection system can only be outwitted with difficulty and with a great degree of effort by systematically running through all of the code possibilities.

We claim:

1. A method for initializing a theft protection system of an automobile, which comprises:

sending a starting signal to a central control unit, for initiating an initialization;

transmitting a challenge signal from the central control unit over a data line;

sending identification code signals to the central control unit from control units connected to the data line and answering the challenge signal;

providing at least one of the control units as an electronically coded plug part containing small electronics, and pluggably and releasably connecting the coded plug part to the data line in a location in the automobile being difficult to find; and storing all of the identification code signals or information regarding all of the answering control units in the central control unit as belonging to the theft protection system, for requesting identification code signals from all of the control units and checking them as to authorization, during future authentication operations.

2. The method according to claim 1, which comprises sending the starting signal from a diagnostic unit located outside the automobile, through a diagnostic interface, to the central control unit.

3. A theft protection system for an automobile initialized by the method according to claim 1, comprising:

a central control unit having an antenna;

a data line connected to said central control unit;

a plurality of control units connected to said data line, at least one of said control units being an electronically coded plug part containing small electronics and being connected pluggably and releasably to said data line in a location in the automobile being difficult to find;

an input unit sending a starting signal to said central control unit for starting an initialization; and a portable code generator sending a code signal to said antenna on request, causing authentication to take place between said central control unit and said control units, and permitting the automobile to be used after authentication has occurred successfully.

4. A theft protection system for an automobile, comprising:

a central control unit having an antenna;

a data line connected to said central control unit;

a plurality of control units connected to said data line, at least one of said control units being an electronically coded plug part containing small electronics and being connected pluggably and releasably to said data line in a location in the automobile being difficult to find;

an input unit sending a starting signal to said central control unit for starting an initialization; and a portable code generator sending a code signal to said antenna on request, causing authentication to take place between said central control unit and said control units, and permitting an automobile to be used after authentication has occurred successfully.

5. The theft protection system according to claim 4, wherein said input unit is a diagnostic unit located outside the automobile, said diagnostic unit sending a starting signal to said central control unit through a diagnostic interface for initiating initialization.

6. The theft protection system according to claim 4, wherein said input unit is an input unit located inside the automobile, said input unit generating the starting signal in the event of predetermined actuation and sending it to said central control unit for initiating initialization.

* * * * *